United States Patent
Zhong et al.

(10) Patent No.: US 10,642,016 B2
(45) Date of Patent: May 5, 2020

(54) NON-FLUORESCENT IMAGING OPTICAL SECTIONING METHOD AND DEVICE BASED ON ANNULAR OFF-AXIS ILLUMINATION FOCAL PLANE CONJUGATION

(71) Applicant: Jinan University, Guangzhou, Guangdong (CN)

(72) Inventors: Jingang Zhong, Guangdong (CN); Xiao Ma, Guangdong (CN)

(73) Assignee: Jinan University, Guangzhou (CN)

(*) Notice: Subject to any disclaimer, the term of this patent is extended or adjusted under 35 U.S.C. 154(b) by 0 days.

(21) Appl. No.: 16/236,646

(22) Filed: Dec. 31, 2018

(65) Prior Publication Data
US 2019/0137747 A1    May 9, 2019

Related U.S. Application Data

(63) Continuation of application No. PCT/CN2018/079702, filed on Mar. 21, 2018.

(30) Foreign Application Priority Data

May 10, 2017   (CN) .......................... 2017 1 0324978

(51) Int. Cl.
*G02B 21/12* (2006.01)
*G02B 21/36* (2006.01)
(Continued)

(52) U.S. Cl.
CPC ............. *G02B 21/12* (2013.01); *G02B 21/02* (2013.01); *G02B 21/084* (2013.01); *G02B 21/10* (2013.01);
(Continued)

(58) Field of Classification Search
CPC ...... G02B 21/12; G02B 21/367; G02B 21/02; G02B 21/084; G02B 21/10; G02B 21/26; G02B 21/33
(Continued)

(56) References Cited

U.S. PATENT DOCUMENTS 4,476,519 A   10/1984   Hayamizu
4,567,551 A   1/1986   Choate
(Continued)

FOREIGN PATENT DOCUMENTS

CN   2416510 Y   1/2001
CN   1692296 A   11/2005
(Continued)

OTHER PUBLICATIONS

Zhou Qian et al., Super-Resolution Optical Subtraction Microscopy Using Optical Scattering Imaging. Acta Phys-Chim. Sin., 2016, 32(5):1123-1128.

*Primary Examiner* — Tung T Vo
(74) *Attorney, Agent, or Firm* — Wayne & Ken, LLC; Tony Hom

(57) ABSTRACT

The invention discloses a non-fluorescent imaging optical sectioning method and device based on annular off-axis illumination focal plane conjugation. In an infinity-corrected optical system constituted by an objective lens with a large numerical aperture and a tube lens, off-axis light beams are used for bright-field microscopic imaging of a non-fluorescent sample; light beams emitted by M sub-sources which form an annularly distributed light source illuminate the sample off-axis at a large inclination angle; all sub-sources are lit to illuminate the sample at the same time, forming a superposed image of the sample illuminated by the M sub-sources individually on an image focal plane of the tube lens, and the camera shoots the image to obtain an optical-section image of a layer in the sample; and under the control (Continued)

of a translation mechanism, a sample stage allows different layers in the sample to coincide with an object focal plane of the objective lens to obtain optical-section images of multiple layers in the sample.

3 Claims, 13 Drawing Sheets

(51) Int. Cl.
  *G02B 21/02* (2006.01)
  *G02B 21/26* (2006.01)
  *G02B 21/08* (2006.01)
  *G02B 21/10* (2006.01)
  *G02B 21/33* (2006.01)

(52) U.S. Cl.
  CPC ........... *G02B 21/26* (2013.01); *G02B 21/367* (2013.01); *G02B 21/33* (2013.01)

(58) Field of Classification Search
  USPC ...................................... 348/97, 79
  See application file for complete search history.

(56) References Cited

U.S. PATENT DOCUMENTS

| | | | | |
|---|---|---|---|---|
| 8,724,882 B2* | 5/2014 | Meshulach | ........ | G01N 21/9501 382/145 |
| 2004/0125373 A1* | 7/2004 | Oldenbourg | ....... | G02B 21/0004 356/364 |
| 2014/0233095 A1* | 8/2014 | Lee | ......... | G02B 21/06 359/385 |
| 2015/0054979 A1* | 2/2015 | Ou | ........ | G02B 21/084 348/222.1 |
| 2015/0160450 A1* | 6/2015 | Ou | ........ | G02B 21/002 348/80 |
| 2017/0045436 A1* | 2/2017 | Fox | .................... | G01N 15/1012 |

FOREIGN PATENT DOCUMENTS

| | | |
|---|---|---|
| CN | 103411557 A | 11/2013 |
| CN | 103438825 A | 12/2013 |
| CN | 103743714 A | 4/2014 |
| CN | 105531529 A | 4/2016 |
| CN | 106526823 A | 3/2017 |
| CN | 106980175 A | 7/2017 |

* cited by examiner

NON-FLUORESCENT IMAGING OPTICAL SECTIONING METHOD AND DEVICE BASED ON ANNULAR OFF-AXIS ILLUMINATION FOCAL PLANE CONJUGATION

CROSS-REFERENCE TO RELATED APPLICATIONS

This application is a continuation of International Patent Application No. PCT/CN2018/079702, filed on Mar. 21, 2018, which claims the benefit of priority from Chinese Application No. 201710324978.7, filed on May 10, 2017. The contents of the aforementioned applications, including any intervening amendments thereto, are incorporated herein by reference in its entirety.

TECHNICAL FIELD

The invention relates to the field of optical imaging technology, and particularly relates to a non-fluorescent imaging optical sectioning method and device based on annular off-axis illumination focal plane conjugation, in particular to focal plane conjugation optical sectioning microscopy by using an annular beam, which is off from the optical axis of an objective lens, illuminating a sample.

BACKGROUND OF THE PRESENT INVENTION

The traditional wide-field microscope, which is widely used in the fields of biomedical and material science, is difficult to obtain microscopic images of an inner three-dimensional structure of a sample due to its large depth of field. Optical sectioning microscopy, which is a method for obtaining images of an inner three-dimensional structure of a sample, further extends the application scope of microscope. Optical sectioning technology can be divided into fluorescence imaging technology and non-fluorescent imaging technology. At present, optical sectioning technologies using fluorescence imaging, such as scanning confocal fluorescence microscopy, structured light illumination fluorescence microscopy and selective plane illumination fluorescence microscopy, are used most frequently. However, for a non-fluorescent sample, only scattered light of the sample can be used for imaging, which is more difficult to achieve than the optical sectioning technique of fluorescence imaging due to the relatively weak signal-to-noise ratio. The scanning confocal microscopy can also be used to perform optical-section imaging of a non-fluorescent sample. The scanning confocal microscopy uses a conjugate image relationship between an illumination pinhole and a detection pinhole to perform confocal point illumination and point detection imaging, that is, to focus the light emitted from the illumination pinhole on a certain point in the focal plane of the sample, with the light scattered from this point being imaged on the detection pinhole, and any scattered light outside this point being blocked by the detection pinhole. By scanning a sample layer at the focal plane point by point, a higher axial resolution can be obtained than by traditional microscopy, thus realizing optical-section imaging. Obviously, the imaging method of point-by-point scanning is time-consuming and very disadvantageous to image dynamic objects. Therefore, there are limitations to the optical-section imaging of living organisms. The structured light illumination microscopy can also be used to perform optical-section imaging of a non-fluorescent sample, but the illumination device is relatively complex due to the use of structured light illumination. In addition, when using fluorescence imaging, the sample needs to be fluorescently labeled, and the fluorescence labeling may have biotoxicity, thus affecting the sample. The excitation light which excites fluorescence has a short wavelength and may also be phototoxic to the sample.

SUMMARY OF THE PRESENT INVENTION

A first purpose of the present invention is, to solve the above-mentioned defects in the prior art, to provide a non-fluorescent imaging optical sectioning method based on annular off-axis illumination focal plane conjugation, which can effectively avoid a point-by-point imaging mode of scanning confocal microscopy, improve the optical-section imaging speed, and avoid the possible biotoxicity and phototoxicity of the fluorescent imaging method to the sample.

Another purpose of the present invention is to provide a non-fluorescent imaging optical sectioning device based on annular off-axis illumination focal plane conjugation in order to solve the above-mentioned defects in the prior art.

The first purpose of the present invention can be achieved by adopting the following technical scheme:

A non-fluorescent imaging optical sectioning method based on annular off-axis illumination focal plane conjugation, including the following steps:

an objective lens with a large numerical aperture and a tube lensconstitute an infinity-corrected optical system, an object focal plane of the objective lens and an image focal plane of the tube lens form a pair of object-image conjugate planes, a layer in the non-fluorescent sample coincides with the object focal plane of the objective lens, light beams emitted by an annularly distributed light source illuminate the sample off an optical axis of the objective lens to form a bright field image at the image focal plane of the tube lens, and the image at the image focal plane of the tube lens is shot by a digital camera;

the annularly distributed light source consists of M sub-sources, and light beams emitted by each of the sub-sources illuminate the sample at an inclination angle $\theta$ off the optical axis of the objective lens;

each of the sub-sources illuminates the sample to form an image on the image focal plane of the tube lens, all sub-sources are lit to illuminate the sample at the same time, forming a superposed image I(x,y) of the sample illuminated by the M sub-sources individually on the image focal plane of the tube lens: $I(x,y)=I_1(x,y)+I_2(x,y)+ \ldots +I_M(x,y)$, and the camera shoots the image to obtain an optical-section image of a layer in the sample;

under the control of a translation mechanism, a sample stage drives the sample to move in a direction of the optical axis of the objective lens, so that different layers in the sample coincide with the object focal plane of the objective lens, and optical-section images of multiple layers in the sample are obtained;

where M is an integer, M≥4; the inclination angle $\theta$ is an included angle between the beam illuminating the sample and the optical axis of the objective lens, ranging from $30° \leq \theta < 90°$; $I_1(x,y), I_2(x,y), \ldots, I_M(x,y)$ are images formed on the image focal plane of the tube lens when each of the sub-sources illuminates the sample individually, and (x,y) is pixel point coordinates of a photosensitive surface of the camera.

Further, the M sub-sources of the annularly distributed light source are divided into N groups; one group of sub-sources are lit each time to illuminate the sample, and the camera sequentially shoots the images formed each time the sample is illuminated, obtaining N images: $I_1(x,y)$, $I_2(x,y)$, ..., $I_N(x,y)$; the N images are used to remove defocused images to obtain an optical-section image $I(x,y)$ in one layer of the sample; an algorithm for removing defocused images is preferably: linear superposition algorithm for N images $I(x,y)=I_1(x,y)+I_2(x,y)+ ... +I_N(x,y)$, or an algorithm for extracting the maximum value of pixel points in the same coordinates of the N images $I(x,y)=\max[I_1(x,y),I_2(x,y), ..., I_N(x,y)]$, or a threshold operation algorithm for filtering out smaller values of three-dimensional gradient of optical-section images of multiple layers in the sample $$I_{\nabla,th}(x, y, z) = \text{Threshold}\left[\sqrt{\left[\frac{\partial I(x, y, z)}{\partial x}\right]^2 + \left[\frac{\partial I(x, y, z)}{\partial y}\right]^2 + \left[\frac{\partial I(x, y, z)}{\partial z}\right]^2}\right];$$

where N is an integer in the range of $2 \le N \le M$, max [ ] is a max operator, z is coordinates of the optical axis direction of the objective lens, Threshold [ ] is a threshold operator, $$\frac{\partial}{\partial x}[]$$

denotes a partial derivative operator in the x direction, $$\frac{\partial}{\partial y}[]$$

denotes a partial derivative operator in the y direction, and $$\frac{\partial}{\partial z}[]$$

denotes a partial derivative operator in the z direction.

Further, the annularly distributed light source is formed by rotating the sub-sources around the optical axis of the objective lens 4 under the control of a rotating mechanism, the camera synchronously shoots an image every time the sub-sources are rotated by an azimuth angle $\Delta\phi$, and the images shot within 360 degrees of rotation are linearly superposed to obtain an optical-section image of one layer in the sample; and the range of the azimuth angle $\Delta\phi$ is $0 < \Delta\phi \le 90°$.

The second purpose of the present invention can be achieved by adopting the following technical scheme:

a non-fluorescent imaging optical sectioning device based on annular off-axis illumination focal plane conjugation, including sequentially an annularly distributed light source, an objective lens, a tube lens and a camera to form an infinity-corrected optical system, wherein a sample is placed on a sample stage, and the sample stage is translatable along an optical axis of the objective lens under the control of a translation mechanism; the objective lens and the tube lens have the same optical axis which passes through the center of the annularly distributed light source; light beams emitted by the annularly distributed light source illuminate the sample at an inclination angle θ off the optical axis of the objective lens, and a photosensitive surface of the camera coincides with an image focal plane of the tube lens; and a computer controls the movement of the translation mechanism and the image shooting of the camera.

Further, the annularly distributed light source consists of M sub-sources and is uniformly distributed to form an annular shape, and a light beam emitted by each of the sub-sources illuminates the sample at an inclination angle θ off the optical axis of the objective lens.

Further, the numerical aperture NA of the objective lens should be large enough so that when the light source illuminates the sample off the optical axis of the objective lens, a bright field image is formed at the image focal plane of the tube lens, and the NA is in the range of $0.75 \le NA < 2.0$.

Further, a refractive index matching lens, which is a hemispherical plano-convex lens or a conical lens, is arranged between the annularly distributed light source and the sample, and a bottom surface of the lens is bonded with a slide glass encapsulating the sample.

Further, the annularly distributed light source consists of two sub-sources arranged on a semi-circular ring which is arranged on a rotating platform, wherein a rotating axis of the rotating platform coincides with the optical axis of the objective lens, and the two sub-sources are symmetrically distributed on both sides of the optical axis of the objective lens and rotate around the optical axis of the objective lens under the control of the rotating platform, thus form an annular illumination of the sample off the optical axis of the objective lens; and a computer simultaneously controls the movement of the translation mechanism, the rotation of the rotating platform and the synchronous shooting of the camera.

Compared with the prior art, the invention has the following advantages and effects:

(1) The scanning confocal microscopy is point-to-point confocal imaging, while the invention is plane-to-plane confocal imaging, which has a faster imaging speed and is convenient for dynamic sample imaging.

(2) Biotoxicity and phototoxicity that fluorescence imaging may produce to the sample are avoided.

(3) The lighting device of the present invention is simple compared to structured light microscopy.

(4) The operation is simple, convenient and practical.

Figure 1:
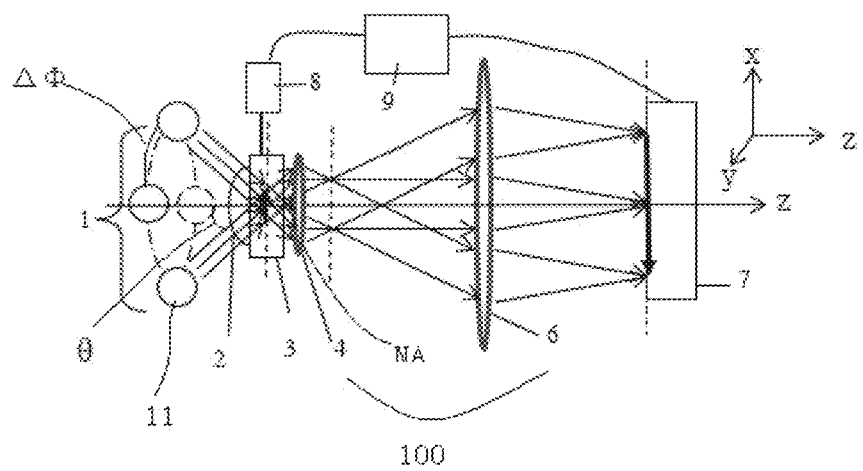
FIG. 1 is a schematic structural diagram of a non-fluorescent imaging optical sectioning device based on annular off-axis illumination focal plane conjugation disclosed in embodiment 2.

In the figures: 1—annularly distributed light source, 2—refractive index matching lens, 3—sample stage, 4—objective lens, 6—tube lens, 7—camera, 8—translation mechanism, 9—computer, 10—rotating platform, 11—sub-source, 100—optical system.

DETAILED DESCRIPTION OF THE PRESENT INVENTION

In order to make the purpose, technical scheme and advantages of the embodiments of the present invention more clear, the technical scheme in the embodiments of the present invention will be described clearly and completely below with reference to the drawings in the embodiments of the present invention. Obviously, the described embodiments are only a part but not all of the embodiments of the present invention. Based on the embodiments of the present invention, all other embodiments obtained by those ordinary skilled in the art without creative effort are within the scope of the present invention.

Embodiment 1

In a traditional bright-field optical microscope, due to the limitation of diffraction, an axial resolvable distance is generally larger than 600 nm, and light beams involved in imaging are mainly beams near an optical axis of an objective lens. In order to improve the axial resolution of microscopic imaging and obtain ultra-thin optical sections, the invention proposes to adopt an objective lens with a large numerical aperture and use light beams at a large inclination angle off the optical axis of the objective lens for imaging. In various conventional microscopic imaging systems, the beams involved in imaging are mainly near-axis beams, which is the biggest difference between the present invention and the conventional microscopic imaging technology. Although a dark-field microscope adopts an off-axis illumination mode, its purpose is to prevent direct lights of the illumination beams from entering the objective lens for imaging, ensuring that the background is a dark field to highlight the image formed by weak scattered lights. However, the scattered lights used for imaging are still mainly near-axis light beams.

This embodiment discloses a non-fluorescent imaging optical sectioning method based on annular off-axis illumination focal plane conjugation, which includes the following steps:

an objective lens 4 with a large numerical aperture and a tube lens 6 constitute an infinity-corrected optical system 100, an object focal plane of the objective lens 4 and an image focal plane of the tube lens 6 form a pair of object-image conjugate planes, a layer in the non-fluorescent sample coincides with the object focal plane of the objective lens 4, light beams emitted by an annularly distributed light source 1 illuminate the sample off an optical axis of the objective lens 4, and an image at the image focal plane of the tube lens 6 is shot by a digital camera 7;

wherein, the annularly distributed light source 1 consists of M sub-sources which are uniformly distributed to form a ring shape, and light beams emitted by each of the sub-sources illuminate the sample at an inclination angle θ off the optical axis; and the sub-light source 11 is an LED light source or a laser light source, but is not limited thereto. The light beams emitted by the sub-sources 11 may directly illuminate the sample or may be transmitted through an optical fiber before illuminating the sample.

Each of the sub-sources 11 illuminates the sample to form an image on the image focal plane of the tube lens 6, all sub-sources 11 are lit to illuminate the sample simultaneously, forming a superposed image I(x,y) of the sample illuminated by the sub-sources 11 individually on the image focal plane of the tube lens 6: $I(x,y)=I_1(x,y)+I_2(x,y)+\ldots+I_M(x,y)$, and the camera shoots the image to obtain an optical-section image of a layer in the sample.

Under the control of a translation mechanism 8, a sample stage 3 drives the sample to move in a direction of the optical axis of the objective lens 4, so that different layers in the sample coincide with the object focal plane of the objective lens, and optical-section images of multiple layers in the sample are obtained;

where M is an integer, M≥4; the inclination angle θ is an included angle between the beam illuminating the sample and the optical axis of the objective lens, ranging from $30°≤θ<90°$; $I_1(x,y), I_2(x,y), \ldots, I_M(x,y)$ are images formed on the image focal plane of the tube lens when each of the sub-sources illuminates the sample individually, and (x,y) is pixel point coordinates of a photosensitive surface of the camera.

The objective lens 4 has a large numerical aperture NA which is in the range of 0.75≤NA<2.0.

The M sub-sources 11 of the annularly distributed light source are divided into N groups; one group of sub-sources are lit each time to illuminate the sample, and the camera sequentially shoots the images formed each time the sample is illuminated, obtaining N images: $I_1(x,y), I_2(x,y), \ldots, I_N(x,y)$; the N images are used to remove defocused images to obtain an optical-section image I(x,y) in one layer of the sample; an algorithm for removing defocused images is preferably: linear superposition algorithm for N images $I(x,y)=I_1(x,y)+I_2(x,y)+\ldots+I_N(x,y)$, or an algorithm for extracting the maximum value of pixel points in the same coordinates of the N images $I(x,y)=\max[I_1(x,y), I_2(x,y), \ldots, I_N(x,y)]$; where N is an integer in the range of 2≤N≤, and max [ ] is a max operator.

One or more of the sub-sources are rotated around the optical axis of the objective lens 4 under the control of a rotating mechanism to form annular off-axis illumination. The camera synchronously shoots an image every time the sub-sources are rotated by an azimuth angle Δϕ, and the images shot within 360 degrees of rotation are linearly superposed to obtain an optical-section image of one layer in the sample. The range of the azimuth angle Δϕ is 0<Δϕ≤90°.

For a sample encapsulated with a slide glass, the off-axis beam emitted by the annularly distributed light source 1 first passes through a refractive index matching lens 2 and then illustrates the sample.

For an infinity-corrected optical system, the object focal plane of the objective lens 4 and the image focal plane of the tube lens 6 have an object-image conjugate relationship. The camera 7 is placed on the image focal plane of the tube lens 6 to obtain an image of a sample layer at the object focal plane of the objective lens 4 under illumination of the sample by the annular off-axis beam at a large inclination angle. FIG. 1 is a schematic diagram of the device of the present invention.

Figure 2:
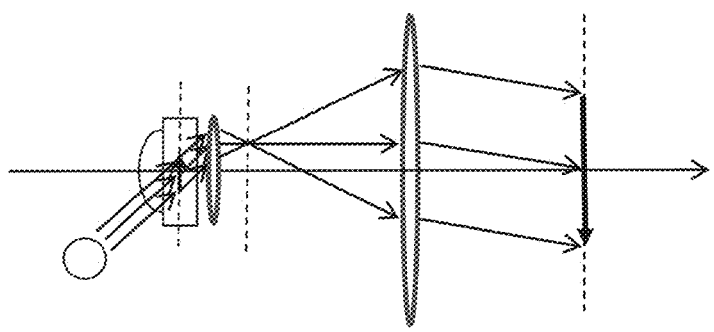
FIG. 2 is a schematic diagram showing imaging of a sample layer at the focal plane under lower off-axis beam illumination.
Figure 3:
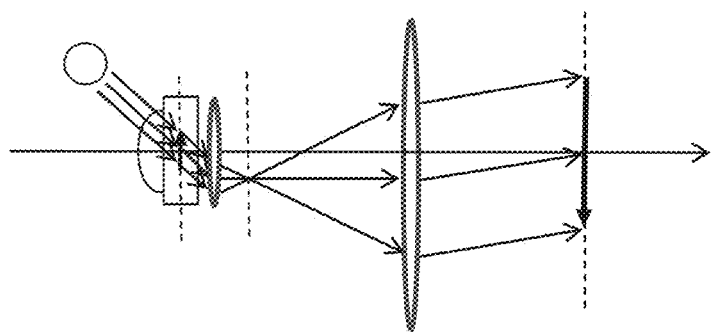
FIG. 3 is a schematic diagram showing imaging of the sample layer at the focal plane under upper off-axis beam illumination.
Figure 4:
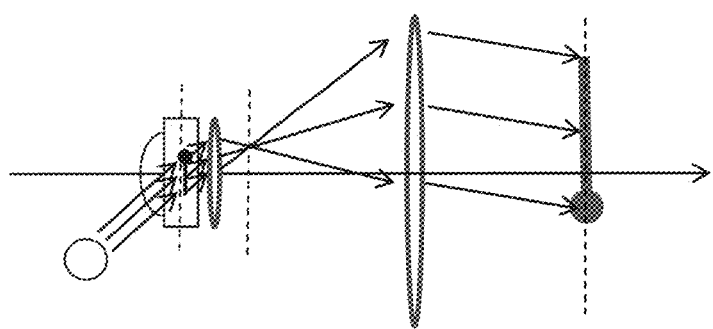
FIG. 4 is a schematic diagram showing imaging at an image focal plane of a tube lens with a defocused sample layer in the focal plane being under lower off-axis beam illumination.
Figure 5:
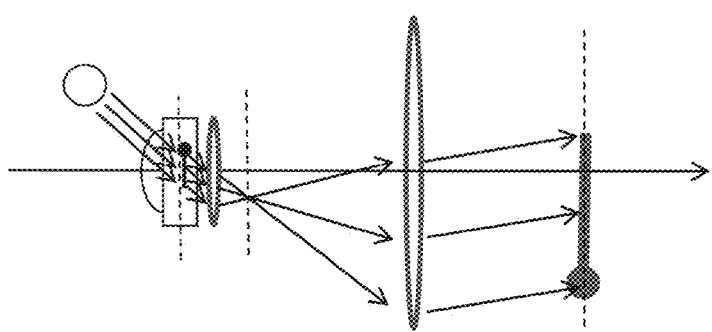
FIG. 5 is a schematic diagram showing imaging at the image focal plane of the tube lens with the defocused sample layer in the focal plane being under upper off-axis beam illumination.
Figure 6:
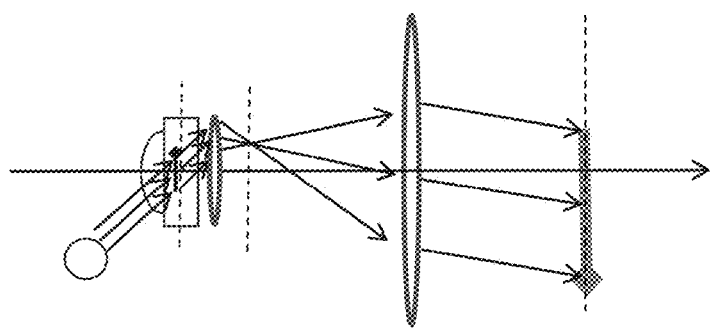
FIG. 6 is a schematic diagram showing imaging at the image focal plane of the tube lens with the defocused sample layer outside the focal plane being under lower off-axis beam illumination.
Figure 7:
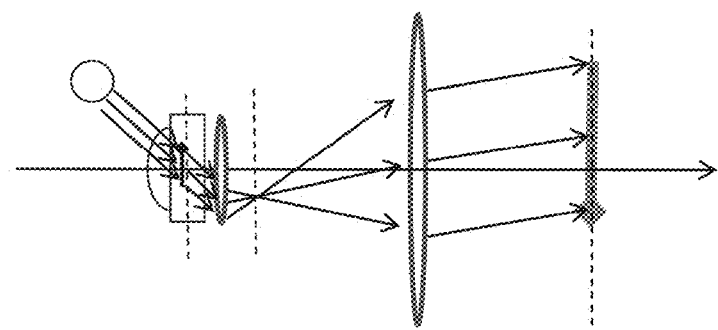
FIG. 7 is a schematic diagram showing imaging at the image focal plane of the tube lens with the defocused sample layer outside the focal plane being under upper off-axis beam illumination.

According to Abbe's coherent imaging theory, in the coherent illumination mode, the illumination beam diffracts as it illuminates the sample, and the direct transmission direction is the zero-order diffraction beam direction (or the zero-order angular spectrum beam direction). The zero-order diffracted beam of the illumination beam in the optical axis direction of the objective lens is still in the optical axis direction; while under the off-axis beam illumination, the zero-order diffracted beam also deviates from the optical axis direction. The zero-order diffracted beam determines where the imaging system images the sample on the image focal plane of the tube lens. FIGS. 2, 3, 4, 5, 6 and 7 show the imaging of a sample layer in the image focal plane of the tube lens when the sample layer is in the focal plane and the defocused plane of the objective lens, respectively. FIGS. 2 and 3 show the imaging of the sample layer at the image focal plane of the tube lens with the sample layer at the focal plane being under the illumination of two symmetrical off-axis beams. FIGS. 4 and 5 show the imaging at the image focal plane of the tube lens with the defocused sample layer in the focal plane being under the illumination of two symmetrical off-axis beams. FIGS. 6 and 7 show the imaging at the image focal plane of the tube lens with the defocused sample layer outside the focal plane being under the illumination of two symmetrical off-axis beams. As can be seen from FIGS. 2 and 3, for the sample layer at the focal plane, the positions of imaging by illumination of off-axis beams at different inclination angles are the same, i.e., the images are overlapped, due to the object-image conjugate relationship between the object focal plane of the objective lens and the image focal plane of the tube lens. As can be seen from FIGS. 4 and 5, and FIGS. 6 and 7, the image plane of the defocused sample layer, whether in or outside the focal plane, is not in the image focal plane of the tube lens. The images shot by the camera on the image focal plane of the tube lens are blurred, and the positions of imaging by illumination of off-axis beams with different inclination angles are different, i.e. the images are staggered. The staggering direction of defocused images is related to the direction of illumination beams. The amount of image staggering is related to the inclination angle of off-axis beam, also to the defocus distance, and also to the microscopic magnification (or the focal length ratio of the tube lens and the objective lens). In particular, the greater the inclination angle is, the larger the staggering amount is; the larger the defocus distance is, the larger the staggering amount is; and the larger the magnification is, the larger the staggering amount is. According to this imaging characteristic, the annular off-axis beams with different directions and large inclination angles are used to illuminate the sample, and the images formed by all the off-axis beams are processed to eliminate the defocused images. For example, the 360-degree annularly distributed light source consists of M sub-sources 11, each of which illuminates the sample individually to form images $I_1(x,y)$, $I_2(x,y)$, ..., $I_M(x,y)$, and these images are linearly superposed to obtain an image $I(x,y)$: $I(x,y)=I_1(x,y)+I_2(x,y)+ ... +I_M(x,y)$. As a result of superposition, the image of the sample layer at the focal plane is enhanced (because the positions of the images formed by illumination in different directions are the same). However, the image of the sample layer at the defocused plane will become more blurred or even disappear (because the positions of the images formed by illumination in different directions are staggered). In this way, a clearer image of the sample layer at the focal plane can be obtained and the axial resolution can be improved, i.e. $I(x,y)$ is an optical-section image of the sample layer. It is also possible to extract the maximum value $I(x,y)=\max\ [I_1(x,y), I_2(x,y), ..., I_M(x,y)]$ of pixel points in the same coordinates of these images and reconstruct an image $I(x,y)$ with the defocused images removed, that is, to obtain an optical-section image of the sample layer. Since the present invention adopts the focal plane conjugation imaging, unlike the focal conjugation imaging of the scanning confocal microscopy, point-by-point scanning imaging is not required, and as compared with the scanning confocal microscopy, the present invention will greatly improve the imaging speed.

It should be noted that although off-axis illumination is adopted, it is still bright-field imaging, so the numerical aperture of the objective lens 4 should be large enough to ensure that the direct light of the illumination beams can enter the objective lens 4 to participate in imaging. The larger the inclination angle θ of the off-axis illumination beams allowable by the objective lens 4 with large numerical aperture is, the better the optical sectioning effect will be.

The reason for using the refractive index matching lens 2 is that if the sample is encapsulated between the slide glass and a cover glass, the light beams emitted by the light source will pass through the air and the slide glass before illuminating the sample. Since the indices of refraction of the air and slide glass do not match, even though the incident angle of the light beams on the slide glass is large, the light beams will refract after entering the slide glass, so that the off-axis inclination angle of the off-axis beams illuminating the sample will be greatly reduced, which is not conducive to improving the axial resolution. By using the refractive index matching lens 2, it can be ensured that the illumination beams finally illuminate the sample at a large off-axis inclination angle.

Embodiment 2

As shown in FIG. 1, this embodiment discloses a non-fluorescent imaging optical sectioning device based on annular off-axis illumination focal plane conjugation, including sequentially an annularly distributed light source 1, an objective lens 4, a tube lens 6 and a camera 7 to form an infinity-corrected optical system. Off-axis light beams emitted by the annularly distributed light source 1 illuminate a sample placed on a sample stage 3 at an inclination angle θ. The sample stage 3 is arranged between the annularly distributed light source 1 and the objective lens 4, and is translatable along an optical axis of the objective lens 4 in a z direction under the control of a translation mechanism 8. The objective lens 4 and the tube lens 6 have the same optical axis which passes through the center of the annularly distributed light source 1. A photosensitive surface of the camera 7 coincides with an image focal plane of the tube lens 6. A computer 9 controls the movement of the translation mechanism 8 and the image shooting of the camera 7.

A refractive index matching lens 2 is arranged between the annularly distributed light source 1 and the sample. The refractive index matching lens 2 is connected with a slide glass carrying the sample by a refractive index matching liquid. The off-axis light beams emitted by the annularly distributed light source 1 pass through the refractive index matching lens 2 to illuminate the sample at an inclination angle θ.

The refractive index matching lens 2 is a spherical plano-convex lens or a conical lens, but is not limited to thereto, and the bottom plane of the lens is connected to the slide glass.

Embodiment 3

Figure 8:
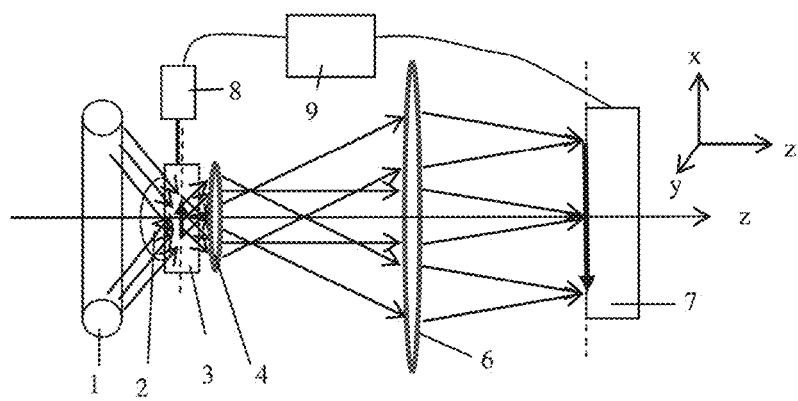
FIG. 8 is a schematic structural diagram of a non-fluorescent imaging optical sectioning device based on annular off-axis illumination focal plane conjugation disclosed in embodiment 3.
Figure 9:
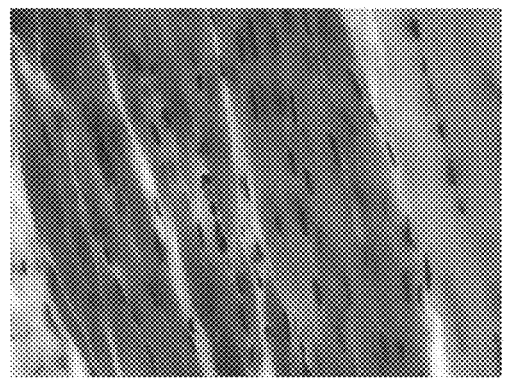
FIG. 9 is an optical-section image of a skeletal muscle sample obtained in embodiment 3.
Figure 10:
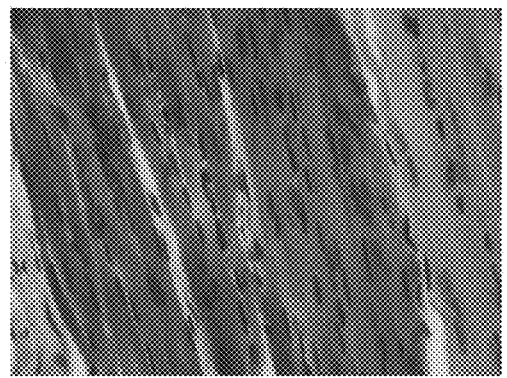
FIG. 10 is a microscopic image of the skeletal muscle sample obtained by ordinary wide-field microscopy.

As shown in FIG. 8, this embodiment discloses another non-fluorescent imaging optical sectioning device based on annular off-axis illumination focal plane conjugation, which uses a 60-fold objective lens 4 with a numerical aperture of 1.49 and a tube lens 6 with a focal length of 200 mm to form an infinity-corrected optical system 100. 80 white LED light sources are uniformly distributed on the inner surface of an annular aluminum alloy with a diameter of 132 mm to form an annularly distributed light source 1, each LED having the same power of 0.15 W. A power supply controller controls the 80 light sources to be lit at the same time. The light beams emitted by each LED light source illuminate a hemispherical plano-convex lens used as the refractive index matching lens 2, which is made of K9 glass material and has a spherical radius of 10 mm. The bottom surface of the hemispherical plano-convex lens is bonded to the slide glass encapsulating the sample by cedar oil and fixed on a sample stage 3. A three-dimensional (x, y, z) translation stage and a one-dimensional (z) nano translation stage form a translation mechanism 8. The sample stage 3 is controlled by the translation mechanism 8 in such a manner that a central axis of the hemispherical plano-convex lens coincides with an optical axis of the objective lens 4, and the sample is placed at an object focal plane of the objective lens 4. The position of the annularly distributed light source 1 is adjusted so that the optical axis of the objective lens passes through the center of the annularly distributed light source 1. Under the control of the translation mechanism 8, the sample stage 3 moves in a Z direction of the optical axis with nanometer-scale precision, so that different layers in the sample coincide with the object focal plane of the objective lens. A computer 9 controls the movement of the translation mechanism 8 and the synchronous shooting of the camera 7. After the device is adjusted, all LED light sources are lit, one layer in the sample is made to coincide with the focal plane of the objective lens, and the camera shoots a resulting image. FIG. 9 is an optical-section image of a skeletal muscle sample taken with this device. For comparison, FIG. 10 shows an image taken with a conventional Nikon inverted wide field microscope. Comparing FIG. 9 with FIG. 10, it can be seen that some defocused images in FIG. 10 have disappeared in FIG. 9, the axial resolution of FIG. 9 has been greatly improved, and the effect of optical sectioning has been obtained.

Embodiment 4

Figure 11:
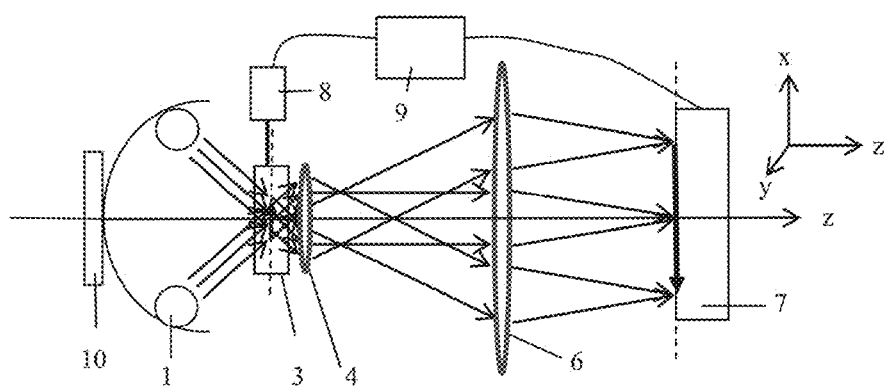
FIG. 11 is a schematic structural diagram of a non-fluorescent imaging optical sectioning device based on annular off-axis illumination focal plane conjugation disclosed in embodiment 4.

As shown in FIG. 11, this embodiment discloses another non-fluorescent imaging optical sectioning device based on annular off-axis illumination focal plane conjugation, which uses a 60-fold objective lens 4 with a numerical aperture of 1.49 and a tube lens 6 with a focal length of 200 mm to form an infinity-corrected optical system 11.

Figure 12:
FIG. 12 is an optical-section image of a lung bronchial sample obtained in embodiment 4.
Figure 13:
FIG. 13 is a microscopic image of the lung bronchial sample obtained by ordinary wide-field microscopy.

Two LED light sources with a power of 0.13 W and a wavelength of 520 nm are arranged on a semi-circular ring having a radius of 78.05 mm and symmetrically distributed on both sides of an optical axis of the objective lens 4. Each LED light source emits a central light having an included angle of 71.3 degrees to the optical axis of the objective lens 4 and intersecting the optical axis of the objective lens 4. The semi-circular ring is arranged on a rotating platform 10 and rotates around the optical axis of the objective lens under the control of the rotating platform 10 to form an annularly distributed light source 1, so as to form annular off-axis illumination. A three-dimensional (x, y, z) translation stage and a one-dimensional (z) nano translation stage form a translation mechanism 8. A sample stage 3 is controlled by the translation mechanism 8 to place the sample at an object focal point of the objective lens 4. The sample stage 3 can be controlled to move in a Z direction with nanometer-scale precision, so as to shoot optical-section images of different layers in the sample. A computer 9 controls the movement of the translation mechanism 8 and the synchronous shooting of the camera 7. The annularly distributed light source 1 that has been lit is driven by the rotating platform 10 to rotate, and the camera 7 synchronously shoots an image every time the light source 1 rotates by an azimuth angle 40. The images shot for one rotation are linearly superposed to obtain an optical-section image of a layer in the sample. FIG. 12 is an optical-section image of a lung and bronchus sample taken with this device. For comparison, FIG. 13 shows an image taken with a conventional Nikon inverted wide field microscope. Compared with FIG. 13, the sectioning effect of FIG. 12 is obvious.

The above embodiments are preferred embodiments of the present invention, but the embodiments of the present invention are not limited thereby, and any other changes, modifications, substitutions, combinations, and simplifications made without departing from the spirit and principles of the present invention are equivalent alternatives and are included within the protection scope of the present invention.

What is claimed is:

1. A non-fluorescent imaging optical sectioning method based on annular off-axis illumination focal plane conjugation, characterized in that the method comprises the following steps:

an objective lens with a large numerical aperture and a tube lens constitute an infinity-corrected optical system, an object focal plane of the objective lens and an image focal plane of the tube lens form a pair of object-image conjugate planes, a layer in the non-fluorescent sample coincides with the object focal plane of the objective lens, light beams emitted by an annularly distributed light source illuminate the sample off an optical axis of the objective lens to form a bright field image at the image focal plane of the tube lens, and the image at the image focal plane of the tube lens is shot by a digital camera;

the annularly distributed light source consists of M sub-sources, and light beams emitted by each of the sub-sources illuminate the sample at an inclination angle θ off the optical axis of the objective lens;

each of the sub-sources illuminates the sample to form an image on the image focal plane of the tube lens, all sub-sources are lit to illuminate the sample simultaneously, forming a superposed image I(x,y) of the sample illuminated by the M sub-sources individually on the image focal plane of the tube lens: $I(x,y)=I_1(x,y)+I_2(x,y)+L+I_M(x,y)$, and the camera shoots the image to obtain an optical-section image of a layer in the sample;

under the control of a translation mechanism, a sample stage drives the sample to move in a direction of the optical axis of the objective lens, so that different layers in the sample coincide with the object focal plane of the objective lens, and optical-section images of multiple layers in the sample are obtained;

where M is an integer, M≥4; the inclination angle θ is an included angle between the beam illuminating the sample and the optical axis of the objective lens, ranging from 30°≤θ<90°; $I_1(x,y)$, $I_2(x,y)$, ..., $I_M(x,y)$ are images formed on the image focal plane of the tube lens when each of the sub-sources illuminates the sample individually, and (x,y) is pixel point coordinates of a photosensitive surface of the camera;

wherein the M sub-sources of the annularly distributed light source are divided into N groups; one group of sub-sources are lit each time to illuminate the sample, and the camera sequentially shoots the images formed each time the sample is illuminated, obtaining N images: $I_1(x,y)$, $I_2(x,y)$, L, $I_N(x,y)$; the N images are used to remove defocused images to obtain an optical-section image I(x,y) in one layer of the sample; an algorithm for removing defocused images is: linear superposition algorithm for N images $I(x,y)=I_1(x,y)+I_2(x,y)+L+I_N(x,y)$, or an algorithm for extracting the maximum value of pixel points in the same coordinates of the N images $I(x,y)=\max[I_1(x,y),I_2(x,y),L,I_N(x,y)]$, or a threshold operation algorithm for filtering out smaller values of three-dimensional gradient of optical-section images of multiple layers in the sample $$I_{\nabla,th}(x,y,z) = \text{Threshold}\left[\sqrt{\left[\frac{\partial I(x,y,z)}{\partial x}\right]^2 + \left[\frac{\partial I(x,y,z)}{\partial y}\right]^2 + \left[\frac{\partial I(x,y,z)}{\partial z}\right]^2}\right];$$

where N is an integer in the range of 2≤N≤M, max [ ] is a max operator, z is coordinates of the optical axis direction of the objective lens, Threshold [ ] is a threshold operator, $\frac{\partial}{\partial x}[]$ denotes a partial derivative operator in the x direction, $\frac{\partial}{\partial y}[]$ denotes a partial derivative operator in the y direction, and $\frac{\partial}{\partial z}[]$ denotes a partial derivative operator in the z direction.

2. The non-fluorescent imaging optical sectioning method based on annular off-axis illumination focal plane conjugation according to claim 1, characterized in that, the annularly distributed light source is formed by rotating the sub-sources around the optical axis of the objective lens 4 under the control of a rotating mechanism, the camera synchronously shoots an image every time the sub-sources are rotated by an azimuth angle Δϕ, and the images shot within 360 degrees of rotation are linearly superposed or the maximum value of the images is taken to obtain an optical-section image of one layer in the sample; and the range of the azimuth angle Δϕ is 0<Δϕ90°.

3. The non-fluorescent imaging optical sectioning method based on annular off-axis illumination focal plane conjugation according to claim 1, characterized in that, the annularly distributed light source is formed by rotating the sub-sources around the optical axis of the objective lens 4 under the control of a rotating mechanism, the camera synchronously shoots an image every time the sub-sources are rotated by an azimuth angle Δϕ, and the images shot within 360 degrees of rotation are linearly superposed or the maximum value of the images is taken to obtain an optical-section image of one layer in the sample; and the range of the azimuth angle Δϕ is 0<Δϕ≤90°.

* * * * *